J. W. Patterson.
Harvester Rake.
No. 19378          Patented Feb. 16, 1858
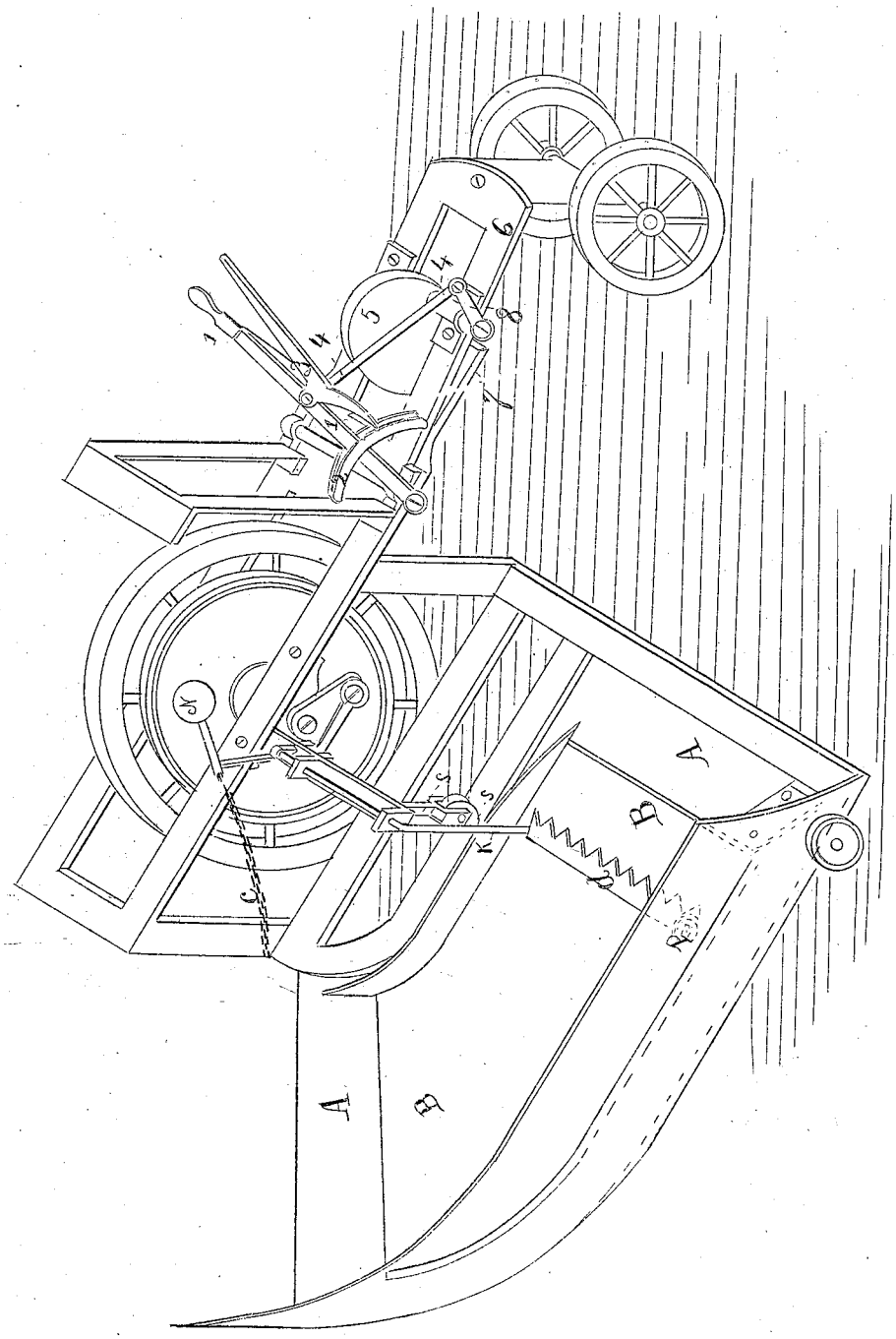

UNITED STATES PATENT OFFICE.

JAS. W. PATTERSON, OF PHILADELPHIA, PENNSYLVANIA.

RAKING ATTACHMENT FOR HARVESTERS.

Specification forming part of Letters Patent No. 19,378, dated February 16, 1858.

*To all whom it may concern:*

Be it known that I, JAS. WILLARD PATTERSON, of the city and county of Philadelphia, in the State of Pennsylvania, have invented a new and useful Self-Raking Attachment for Delivering Grain from Reaping and Mowing Machines, consisting of a reciprocating rake with a double or counter platform, forming a hollow chamber between the two; and I do hereby declare that the following is a clear and exact description of the construction and operation of the same, reference being had to the annexed drawing, making a part of this specification, which represents a combined reaping and mowing machine with rake and platforms attached, the cutting attachment not being represented.

Letter A on the drawing represents the base or lower platform; B, the counter or elevated platform, sufficiently elevated to form the hollow chamber through which the rake passes, as hereinafter described. Platform B is supported at the outer edge, forming a table-leaf, this peculiar form of construction being necessary for the operation of the rake.

K represents the rake-arm in an angular form.

d represents the rake, the teeth being pointed, of a half-diamond form, this peculiar construction being best calculated to hold the grain firm on the rake during its operation.

S represents the caster-wheel supporting the weight and labor of the rake by the rake-arm, and avoids friction. The caster-wheel rides on a track or rail attached to the frame-work.

P represents the small wheel attached to the end of the rake. Said wheel rides on an incline-plane track from the lower platform to the top of the elevated platform, carrying a portion of the weight of the rake.

O represents the incline-plane or hinge rail, which rises as the wheel P passes under it, and drops down as soon as the passage is made.

N represents a weight operating on the rake, in the form of a ball, the use of which is to keep the rake steady during its passage under the platform; also, to cause the rake to drop down quickly at the back end of the counter-platform, thereby loosening its hold on the grain and allowing the grain to pass off in a body.

C represents the chain attached by an upright lever to the rake-arm, and fastened at the other end of the chain to the frame-work in the rear, the use of which chain, operating on the lever, is to throw the rake sufficiently forward to clear the front edge of the elevated platform B; also, to cause the wheel P to open and close the incline-plane track O, giving passage to the rake in its reciprocating movements. This reciprocating rake, as it operates, traverses the hollow chamber, between the two platforms, in its passage forward, and rides over the top of the elevated platform as it passes backward. The rake-arm is attached to the frame-work, and is driven backward and forward by means of a pitman and crank attached to the shaft of the main driving-wheel, or otherwise.

What I claim as new and useful, and for which I ask Letters Patent, is—

The combination of the elevated or counter platform B, which receives the grain, and from which the rake d receives and deposits it with the rake, as arranged—viz., with the wheel P, on which the outer end of the rake rides, the incline-plane or hinge rail O, the weight or ball N, and the chain C—substantially as herein set forth and described.

JAS. WILLARD PATTERSON.

Witnesses:
JOHN WYETH,
GEORGE A. NEWMAN.